United States Patent [19]
Fulger et al.

[11] Patent Number: 5,601,865
[45] Date of Patent: Feb. 11, 1997

[54] FLAVOR ENCAPSULATION

[75] Inventors: Charles V. Fulger; Lewis M. Popplewell, both of Cockeysville, Md.

[73] Assignee: McCormick & Company, Inc., Sparks, Md.

[21] Appl. No.: 419,953

[22] Filed: Apr. 10, 1995

Related U.S. Application Data

[63] Continuation of Ser. No. 948,737, Sep. 22, 1992, abandoned.

[51] Int. Cl.$^6$ ........................................... A23L 1/22
[52] U.S. Cl. ............................ 426/650; 426/651
[58] Field of Search ................................ 426/96, 650, 651

[56] References Cited

U.S. PATENT DOCUMENTS

| | | | |
|---|---|---|---|
| 3,821,447 | 6/1974 | Jasovsky et al. | |
| 4,008,340 | 2/1977 | Kung et al. | |
| 4,232,047 | 11/1980 | Sair et al. | 426/96 |
| 4,610,890 | 9/1986 | Miller et al. | |
| 4,689,235 | 8/1987 | Barnes et al. | |
| 4,707,367 | 11/1987 | Miller et al. | |
| 4,820,534 | 4/1989 | Saleeb et al. | |
| 5,009,900 | 4/1991 | Levine et al. | |
| 5,087,461 | 2/1992 | Levine et al. | |
| 5,399,368 | 3/1995 | Garwood et al. | |

FOREIGN PATENT DOCUMENTS

| | | |
|---|---|---|
| 0158460 | 10/1985 | European Pat. Off. |
| WO85/03414 | 8/1985 | WIPO |

*Primary Examiner*—Carolyn Paden
*Attorney, Agent, or Firm*—Oblon, Spivak, McClelland, Maier & Neustadt, P.C.

[57] ABSTRACT

A process for incorporating a volatile component into a matrix comprising; (a) forming a melt comprising said volatile component and said matrix, (b) solidifying said melt under a pressure sufficient to prevent substantial volatilization of said volatile component.

20 Claims, 4 Drawing Sheets

FLAVOR ENCAPSULATION

This application is a continuation of application Ser. No. 07/948,437, filed on Sep. 22, 1992, now abandoned.

TECHNICAL FIELD

The present invention relates to techniques to encapsulate materials which can undergo compositional changes in process and/or storage. Such encapsulation improves material shelf-life and usefulness in the preparation of products such as foods.

BACKGROUND OF THE INVENTION

It has long been recognized that it is desirable to encapsulate materials so as to protect them from volatilization, the degradation effects of oxygen and heat, moisture, internal and external molecular interactions and the like. Flavors are complex substances made up of multiple chemical components, some comparatively stable, some extremely volatile, others unstable to oxidation and reactive interactions and the like. Many flavorants contain top notes (i.e., dimethyl sulfide, acetaldehyde), which are quite volatile, vaporizing at or below room temperature. These top notes are often what give foods their fresh flavors.

Numerous techniques have been suggested and many commercialized for the encapsulation of flavors. However, all of these techniques suffer from one or more deficiencies. One of the most common techniques for encapsulating flavorants is spray drying. While this process directly produces a finely divided product which can be readily handled and used in the preparation of finished foods, spray drying suffers from several serious deficiencies. First, it is difficult to incorporate top notes into spray dried flavorants in an efficient manner. Inherent in spray drying is the loss of volatile materials. Furthermore, materials which are heat and/or oxygen sensitive are adversely affected by spray drying. The effect of heat, oxygen and volatilization can make a substantial change in the materials' composition, which in turn results in undesirable changes in flavor characteristics.

Freeze-drying solutions of matrix materials containing either dissolved or dispersed flavors has also been used to produce encapsulated flavors. These methods generally result in losses of highly volatile components, and products having a foamy, porous structure.

Yet another technique which has been employed is that of melt encapsulation of materials in carbohydrate matrices. In this application a carbohydrate melt is prepared and the encapsulate is added. The resulting solution is introduced into a quenching medium to produce a solid carbohydrate product containing the flavor. This technique while successful, is again, limited to comparatively high boiling point flavors because the carbohydrate solution is produced and delivered to the quenching medium at elevated temperatures. This technique inherently can result in the loss of some of the low boiling point constituents in the flavor. Because of such losses, it is common to enhance the flavorant by adding extra low-boiling components. The conventional quenching agent which is commercially employed is isopropyl alcohol. The traces of the isopropyl alcohol remaining in the product after quenching can be detrimental. This technique limits the materials which can be encapsulated to those which are immiscible in the matrix. An additional disadvantage of the product resulting from this process is that although reasonably dense, the product may contain microporosity when low boiling point components are present in the flavor. The microporosity increases the surface area, and thus, may increase the evaporation of volatiles and the potential for degradation of the product by interaction with atmospheric oxygen. Furthermore, the effect of the microporosity is enhanced as the product is sold in a finely divided state, which increases the surface area of the particles and thus the possibility that degradation of the flavor will occur if the product is stored over a period of time.

The above encapsulation technology was first developed using batch type melting and mixing equipment. These techniques have been improved as described in U.S. Pat. No. 4,610,890 ('890) and 4,707,367 ('367). In these patents, a process is described for preparing a solid, essential-oil containing composition. This composition is prepared by forming an aqueous, high-solids solution containing a sugar, a starch hydrolysate and an emulsifier. The essential oil is blended with this aqueous solution in a closed vessel under controlled pressure conditions to form a homogenous melt which is then extruded into a relatively cold solvent, normally isopropanol, dried and combined with an anti-caking agent after grinding. A discussion of these and other prior art techniques for encapsulating materials can be found in U.S. Pat. No. 5,009,900. The patents '890 and '367 suffer from the same deficiencies noted in prior art techniques, i.e., loss of volatile compounds and limitations to immiscible flavor encapsulates.

While the above described solidified melt encapsulation technology was first developed using batch type equipment, more recently similar continuous processes have used extruders to produce encapsulated products. One problem encountered in extrusion is the difficulty in obtaining an encapsulant which will melt under reasonable extrusion temperatures. An additional problem with extruded products under typical melting temperatures is that the product will expand and foam upon exit from the extruder head due to expansion of contained volatiles. The objective in encapsulation is to form a hard, dense, glassy type encapsulant. One approach is that described in U.S. Pat. No. 4,820,534 ('534). This patent suggests utilizing as the encapsulant a mixture of two materials, one having a high molecular weight and the other having a low molecular weight; as a result, the mixture may be successfully extruded. During extrusion, according to '534, the minor component melts and the major component dissolves into the minor component. The volatile flavorant becomes dispersed or solubilized within the molten mass which upon cooling produces a single phase matrix. In order for volatile components to be retained, and expansion of the matrix prevented, it is necessary in the process of '534 to minimize the temperature at the extruder head. If the material exits the extruder at a higher temperature, volatiles will be lost from the mixture. The '534 technique needs to utilize as the encapsulant a mixture of materials, one having a melting point sufficiently low such that the remainder will melt into it thereby becoming extrudable under reasonable process conditions.

U.S. Pat. No. 5,009,900 ('900) is directed to a procedure very similar to that of '534 only using a more complex mixture of materials to form the encapsulant material. The '900 patent requires a water-soluble, chemically-modified starch, maltodextrin, corn syrup solids and mono- or disaccharides. The flavorant is mixed into the mixture and the result is extruded.

It would not be possible with either of the techniques of '534 or '900 to encapsulate pure low boiling point materials such as acetaldehyde in a dense matrix at commercially significant loads since the resulting product would foam due to the vaporization of acetaldehyde as it exits the extruder. Furthermore, in both techniques one is restrained by processing considerations in the selection of encapsulate material. Similar techniques are taught in U.S. Pat. No. 4,232,047 ('047). The process of '047 proposes to encapsulate a seasoning or flavoring such as oleoresin, essential oils and the like in a matrix of starch, protein, flour and the like. This technique involves the use of extrusion under high pressure. However, like the other techniques, it is limited in the materials which can be used as the encapsulating agent and the materials to be encapsulated therein. The temperatures involved could cause the loss of volatile top notes.

Another example of the technology which is available is U.S. Pat. No. 4,689,235 ('235) which like '900 and '534 is directed to specific matrix materials for use in encapsulation. This patent relies upon the use of an emulsifier to achieve success.

As evidenced by the foregoing patents, significant effort has been expended in attempting to develop a successful method for encapsulating volatile and/or unstable flavors using solidified melts. These techniques would have the advantage over spray drying in that the product, if a dense matrix can be formed, would not be porous like the spray dried product, thus the flavor encapsulate would be more stable. It would be anticipated that such products would have a long shelf life. However, these technologies do not assure a non-porous product when the pressurized melt exits to ambient pressure and temperature.

In addition to the foregoing deficiencies which have been noted in the prior art techniques, still other deficiencies are that each of these processes is very specific to the encapsulating composition. That is, they significantly restrict the compositions which can be used as encapsulants to a very narrow range.

In producing encapsulated products, it is desirable that the encapsulant have a softening temperature significantly above room temperature. If the softening temperature is low, the material will become tacky, forming lumps which are difficult to handle and process. Patents '534 and '900 suggest utilizing complex mixtures of materials as the encapsulant, such that the resultant matrix is in the glassy state with softening temperatures greater than 40° C.

While solidified melt techniques have, to greater or lesser extent, been utilized commercially to encapsulate some flavorants in dense amorphous matrices, there are many flavorants which simply cannot be encapsulated by existing technology. For example, flavorants which are normally commercially produced in the form of a solution simply cannot be encapsulated at useful levels using existing techniques if the solvent plasticizes the matrix materials. With flavorants such as vanilla extract, it is impossible to remove the water/alcohol solvent without adversely affecting the properties of the vanilla. Even in concentrated form, there still would be appreciable solvent present. Accordingly, vanilla extract has not been successfully encapsulated at commercially useful levels using the above techniques. Therefore, a need exists for a new process to produce dense, non-porous matrices to encapsulate materials that exist in high concentrations of solvents.

DESCRIPTION OF THE INVENTION

Accordingly, it is an object of the present invention to provide a process to encapsulate a wide range of materials, including flavorants, fragrances, colors, pharmaceuticals and the like, without the loss of volatile materials, oxidative degradation, molecular reactions and other adverse interactions with the environment.

Further, it is another object of the present invention to provide a process for encapsulating both miscible and immiscible materials.

It is yet another object of the present invention to provide an encapsulating system for flavorants which are normally dissolved in water, alcohol or other volatile solvent systems.

It is still a further object of this invention to provide a technique for encapsulating flavor components which have low boiling points in a dense non-porous encapsulant.

It is still another object of the present invention to provide a process which allows the use of encapsulating materials which would normally puff or foam when the melt is released from pressure.

It is also an object of the invention to prevent molecular migration by the formation of the dense amorphous solid, thus reducing molecular interactions and changes.

These and other objects of the invention which will become apparent from the description hereafter, have been achieved by a process wherein a melt is made of the encapsulant and encapsulate; and the molten matrix containing the encapsulate is cooled by overriding solid, liquid, or gaseous pressure into a dense amorphous matrix.

A second embodiment involves forming a melt containing an encapsulate dissolved in a solvent and an encapsulating matrix which is optionally subjected to an elevated pressure, followed by venting to remove at least some of the solvent while largely retaining the encapsulate in the product.

In this invention, the dense amorphous, essentially non-crystalline solid encapsulant may be described in many cases but not exclusively by those knowledgeable in the art as a 'glass' as characterized by a glass transition temperature.

DESCRIPTION OF THE PREFERRED EMBODIMENTS

Figure 1:
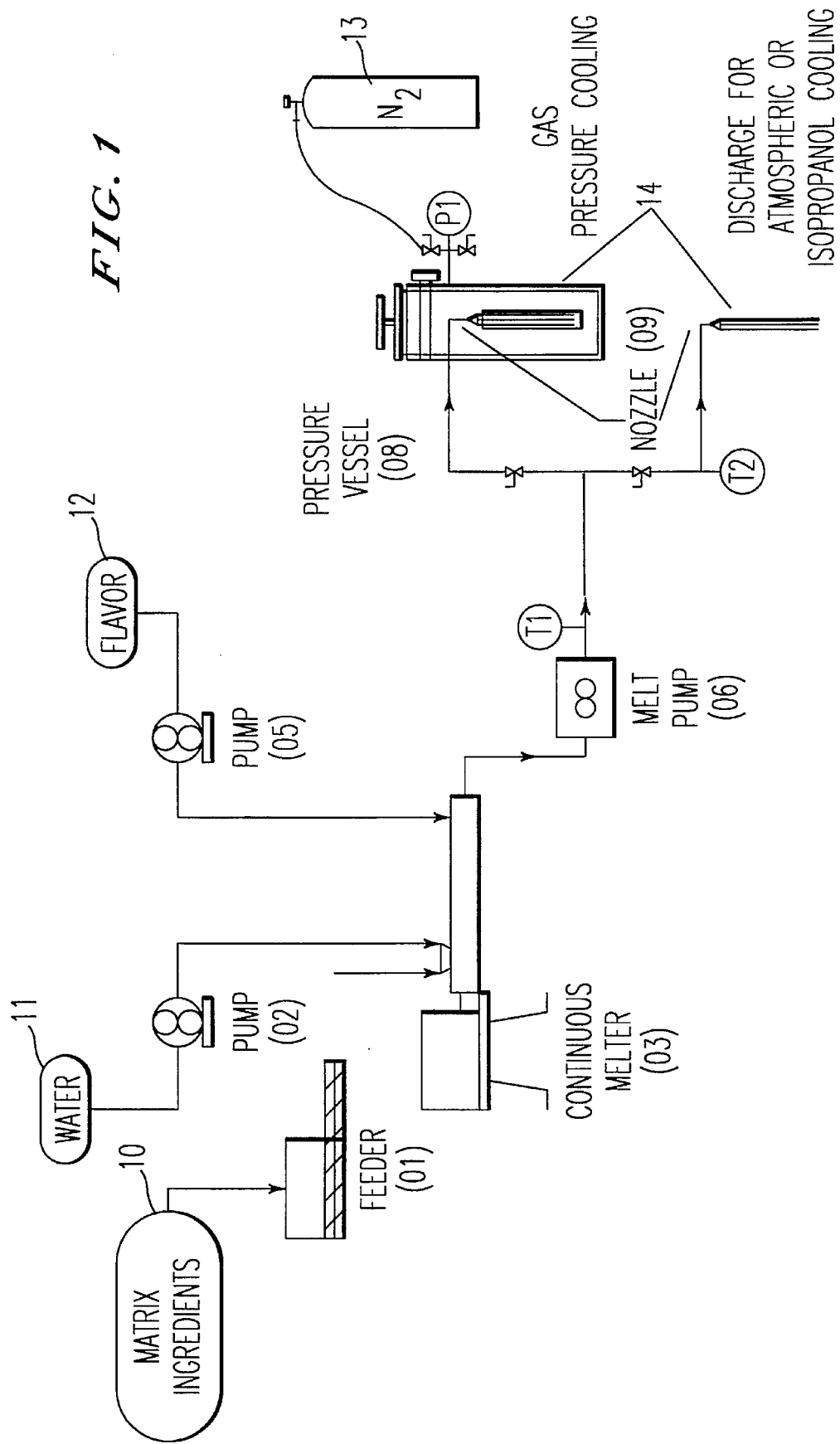
FIG. 1 is an illustration of the present process where the flavor component to be encapsulated is introduced into the extruder where a matrix material has been melted. The drawing shows both atmospheric and pressurized discharge points. These were used in examples to produce comparative samples.

In the present process, melting equipment (herein referred to as "melter") is utilized to convert the matrix from solid to liquid form. The components of the matrix are introduced into a melter where they are liquefied. The melting may be accomplished in a batch containment. The melter also can be simply a device transporting the matrix through a heating zone wherein sufficient heat is introduced to convert the matrix to liquid form, i.e., melted. The process can utilize a conventional single or twin screw extruder having mixing zones, homogenizing zones, melting zones, venting zones and the like as is conventionally known in the art. The matrix materials may be composed of a variety of melting compositions so that the resulting dense matrix will not become sticky and agglomerate at lower temperatures yet will melt/ dissolve at under normal application conditions and temperatures as described in the prior art. Any meltable matrix ingredient can be utilized.

When utilizing materials having a low melting temperature, it is often possible to directly melt the material in a suitable processor. As described in the art, it may be necessary with high melting temperature materials to utilize a solvent with the purpose of generating enough "plasticity" to the matrix materials so they can be processed successfully. The amount of solvent added generally is insufficient to dissolve all of the matrix materials, but is sufficient only to increase plasticity. The minimum amount of solvent is utilized which provides enough plasticity to the matrix ingredients such that they can be successfully processed. The optimum amount of solvent for use varies from matrix to matrix.

The solvents which can function as the plasticizer include any liquid material in which the matrix is soluble. Typical solvents include water, water-ethanol, glycerin, propylene glycol and the like. An optional process step, venting, can be added where some or all of the solvent can be removed. Following, the encapsulate is then mixed into the matrix. Essentially any encapsulate, insoluble, slightly soluble or miscible in the matrix may be employed in this particular embodiment. In cases where the encapsulate exists as a solution in a volatile solvent (e.g. water, alcohol), the melt may be vented to substantially eliminate the encapsulate solvent.

Cooling of the melt can be accomplished at ambient conditions, with cooled gas, by direct contact with metal belts or rolls, or by quenching in a suitable solvent, as in the prior art, or most preferably as introduced by the invention, under pressure so as to prevent "puffing" or expansion of the matrix material into a non-dense, porous form.

When one is concerned with either reducing the microporosity of the matrix or with encapsulating volatile components, this embodiment can be performed using a wide variety of apparatus to form the melt and to extrude it through a die into the pressurized zone. The simplest technique is to form a melt using the procedures described in U.S. Pat. No. 4,610,890 and 4,707,367. These techniques utilize a batch reactor to form the melt. In this technique, the matrix material with suitable solvent is introduced into the tank and melted. Once the melt has been established, then the material to be encapsulated is added. It is possible to vary this procedure where the material to be encapsulated also functions as a solvent for the solid matrix material. In this instance, the encapsulate and solid matrix are added together without the use of any separate solvent and the melt established. The tank or vessel in which this is accomplished, can either be opened to the atmosphere or closed. It is particularly preferred that the vessel be a pressure vessel and closed during the process so as to reduce the losses of any volatile components in the material to be encapsulated. If the volatile components comprise a significant portion of the encapsulant, then pressure should be established in the vessel so as to reduce the vaporization of the low boiling components in the vessel and thereby increase their yield. Once the melt has been established, the vessel can then be pressurized further, if necessary, and the pressure in the vessel used to force the melt through the die into a solidification zone. Prior art as described above used an ambient pressure solidification step. The present invention introduces the use of a pressurized solidification zone having a pressure sufficient to preclude the vaporization of the significant portion of the volatile components in the melt during solidification. The pressure in the solidification zone is chosen to be sufficient so as to prevent puffing or microporosity. The melt can be delivered by either the pressure of the containment or by a pump to the die. Other techniques for forming a melt containing the matrix and encapsulant can also be used. Essentially any of the techniques described in the prior art for forming a mixture of matrix and encapsulant can be used. On a continuous basis, the use of extrusion is preferred. When simple sugars are used as the matrix, the heat necessary to form the melt can be provided by the mechanical working of the screw alone or in cooperation with external sources of heat. Heated extruders for use in the food industry are well known and can be used for this purpose so that heat from both the external sources, such as the steam jacket around the extruder, as well as from the mechanical working of the extruder can be used.

When it is necessary to use a separate solvent to plasticize the matrix prior to introducing the encapsulant, the plasticizer/matrix melt may have its pressure reduced so as to vaporize a portion of the plasticizer. This reducing of pressure or venting to vaporize a portion of plasticizer may occur either before or after the encapsulate is introduced into the matrix into the melt when the encapsulate is of low volatility. If it is a highly volatile encapsulate then, the venting should occur prior to introduction of the high volatile component. After the highly volatile component is added, the melt is then extruded through a die and pressure cooled. Venting is particularly advantageous for use with encapsulates which are dissolved in a solvent which also function as plasticizers for the melts. Where both plasticizer and encapsulate are used and the matrix is soluble in both, the resulting solid product may have undesirable properties, such as tackiness, softness at low temperatures and a tendency to agglomerate. One technique for avoiding these problems is to simply use a total quantity of plasticizer and encapsulate which results in the desired properties. This procedure would restrict the loading of encapsulate which can be used. By venting the plasticizer, it is possible to incorporate higher quantities of encapsulate into the matrix without adversely affecting the properties of the final product.

When venting is used, it is necessary to repressurize the melt after the venting so as to eliminate from the melt any bubbles which might have been caused by venting of the solvent. In an extruder, this is easily accomplished using appropriate screw configurations. In other techniques, introduction of the melt into a melt pump after venting can accomplish the same purpose. The degree of repressurization depends upon the degree of pressure necessary to remove the voids which were formed in the matrix by the venting and be sufficient to allow extrusion through the die into the pressurized zone where cooling or solidification of the melt occurs.

While the foregoing discussion has presupposed that it is necessary to utilize a plasticizer and/or encapsulant to form the matrix melt, some matrices can be melted directly without the use of plasticizer and the encapsulate directly introduced into this melt. With such matrices, venting is not necessary. Further, when one is encapsulating an immiscible encapsulate, venting does not increase the total amount of encapsulate which can be incorporated into the matrix since the immiscible encapsulates have only a small effect upon the physical properties of the final product. In such instances, the removal of plasticizer is used primarily to control the properties of the final product. The use of large quantities of plasticizer tends to produce a softer and tackier product than reduced quantities of plasticizer in general. When the finished product is tacky, it may be overcoated with a material to reduce tackiness. Furthermore, in the case of a soft product, there is more of a tendency for the encapsulate to migrate to the surface and possibly to evaporate from the product. In such instances, it is possible to overcoat the product with a hard coating which prevents or reduces such migration and evaporation.

FIG. 1 illustrates one method by which the process can be accomplished. In FIG. 1, the matrix material is introduced into a continuous melter where it is melted. If necessary, the solvents described above will also be used to assist in the melting process. In the mixing zone of the melter 03, the injected encapsulate is mixed into the matrix. The matrix is then extruded and cooled to form the encapsulated product. The extrusion may be directly from the melting equipment under pressure or, as shown in FIG. 1, a melt pump 06 may be employed to feed the extrusion die. In FIG. 1, alternative methods are illustrated for cooling the encapsulated material. Discharge of the molten matrix/encapsulate mixture to atmospheric pressure illustrates the state of the art technique. For the embodiment of the current invention, the mixture of matrix and encapsulate is introduced into a pressure vessel, 08, where it is formed through a nozzle 09 into a continuous/batch pressure confinement. In this particular embodiment the pressure is provided by any gas, if necessary, food grade and/or inert, such as nitrogen, helium, or the like in pressure holding vessel 13. Pressure cooling is utilized wherein either the encapsulate contains a substantial quantity of volatile components, that is, components having boiling points substantially below the temperature of the melt.

After cooling under pressure, the product generally needs size reduction by grinding or the like to provide a free flowing material which is readily mixed with other components. If extruded, the nozzle utilized to extrude can be any type of nozzle and the size of the strands to be extruded is not critical. Typically, a "spaghetti" type nozzle will be employed so as to minimize the amount of particle size reduction which must be accomplished mechanically.

Numerous techniques exist in the plastics industry to chop or otherwise reduce in size long plastic strands for subsequent sale and use. Similar types of size reduction apparatus can be utilized in the present process. Some extruders have been sold where the face of the die is wiped continuously by knives to immediately reduce the exiting material to the desired size while plastic, and the thus divided material quenched in a suitable coolant. Such techniques can be applied in the present process as well.

An alternative method of recovering the product is to extrude the material into a pressurized mold and then allowing the material to solidify into a dense, nonporous mass. The mold can be cooled to assist in this process. In this particular embodiment, it would be preferable to employ injection molding type apparatus such as is well known in the plastics forming industry. In an injection molding apparatus, the molds are normally closed and the material injected under pressure and cooled before the mold is opened.

A further alternative is to introduce the melt under pressure into a body of liquid having a sufficient liquid head so as to establish a pressure at the point of melt introduction sufficient to preclude substantial volatilization of the volatile component. Essentially any liquid can be used for this purpose, however, food grade liquids are preferred. Alternatively, overriding gas pressure can be used over the body of liquid to assist in establishing the pressure at the point of melt introduction into the liquid body.

In pressure cooling, the pressure is chosen to be sufficiently high so as to prevent foaming of the matrix if the matrix expands due to the vapor pressure of the plasticizer, solvent, or encapsulate. The amount of pressure necessary can be readily determined by simple experimentation. In the case of volatile components, the pressure should be greater than the vapor pressure exerted by the volatile components at the molten product exit temperature. Many materials, e.g., the essential oils like orange oil, lemon oil and the like do not necessarily require pressure cooling since they tend to contain only small quantities of highly volatile materials. However, when these materials are enhanced with low boiling point top notes such as acetaldehyde, pressure cooling may offer advantages in reducing the microporosity of the finished product. The use of pressure cooling or atmospheric cooling with these materials is a matter of choice.

Figure 2:
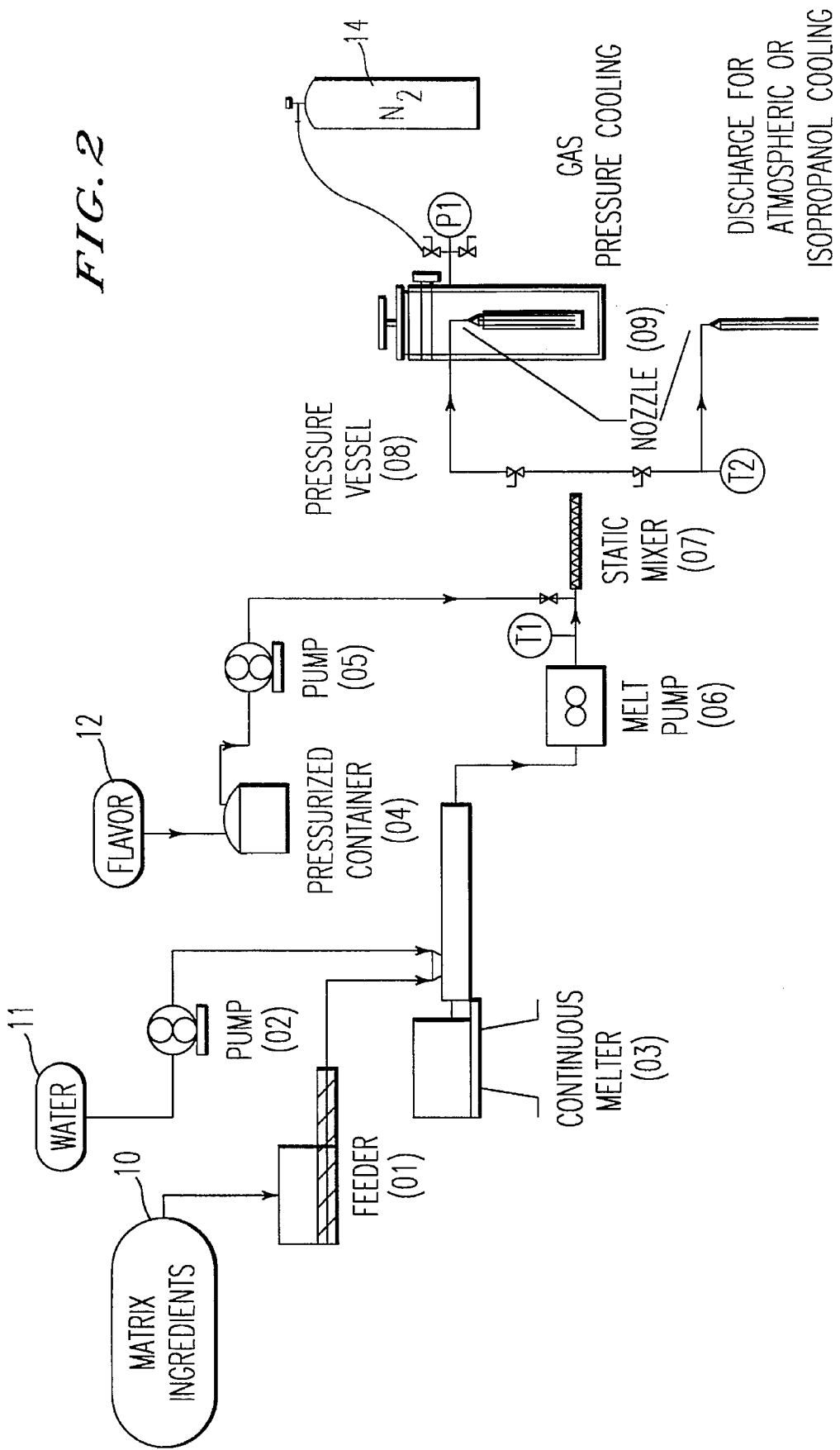
FIG. 2 is an illustration of another embodiment wherein the matrix is first melted in an extruder and the flavor and melted matrix material are mixed in a static mixture and then recovered. The drawing shows both atmospheric and pressurized discharge points. These were used in examples to produce comparative samples.

In an alternative embodiment, illustrated in FIG. 2, the encapsulate is not introduced into the melter directly but rather is introduced either immediately prior to or into a static mixer into which the melted matrix ingredients are also introduced. The static mixer is illustrated as item 07, FIG. 2. The remainder of the system is similar to that illustrated in FIG. 1. In this embodiment, it is anticipated that the encapsulate in vessel 12, will be fed to a pressurized container, 04, and then pumped to the static mixer. However, the use of a pressurized container is dependent on the volatility of the encapsulate. In this embodiment, as in the previous embodiment, the plasticizer solvent can be vented from the system before the matrix and flavor components are admixed. Further, the melt pump, 06, can be omitted if the molten matrix is introduced directly from the continuous processor into the static mixer. In this embodiment, the encapsulates which are employed are typically those which have high solubility in the molten matrix, or disperse easily at the desired concentration level. In addition, this system also finds particular use when highly volatile components are to be encapsulated. The use of pump 05 and melt pump 06 facilitate the injection of low boiling point components into the molten matrix. The remainder of the process after the static mixer is the same as for the previous embodiment. Examples of products which can be encapsulated by this technique include fragrances, colors, flavors, pharmaceuticals and the like.

Figure 3:
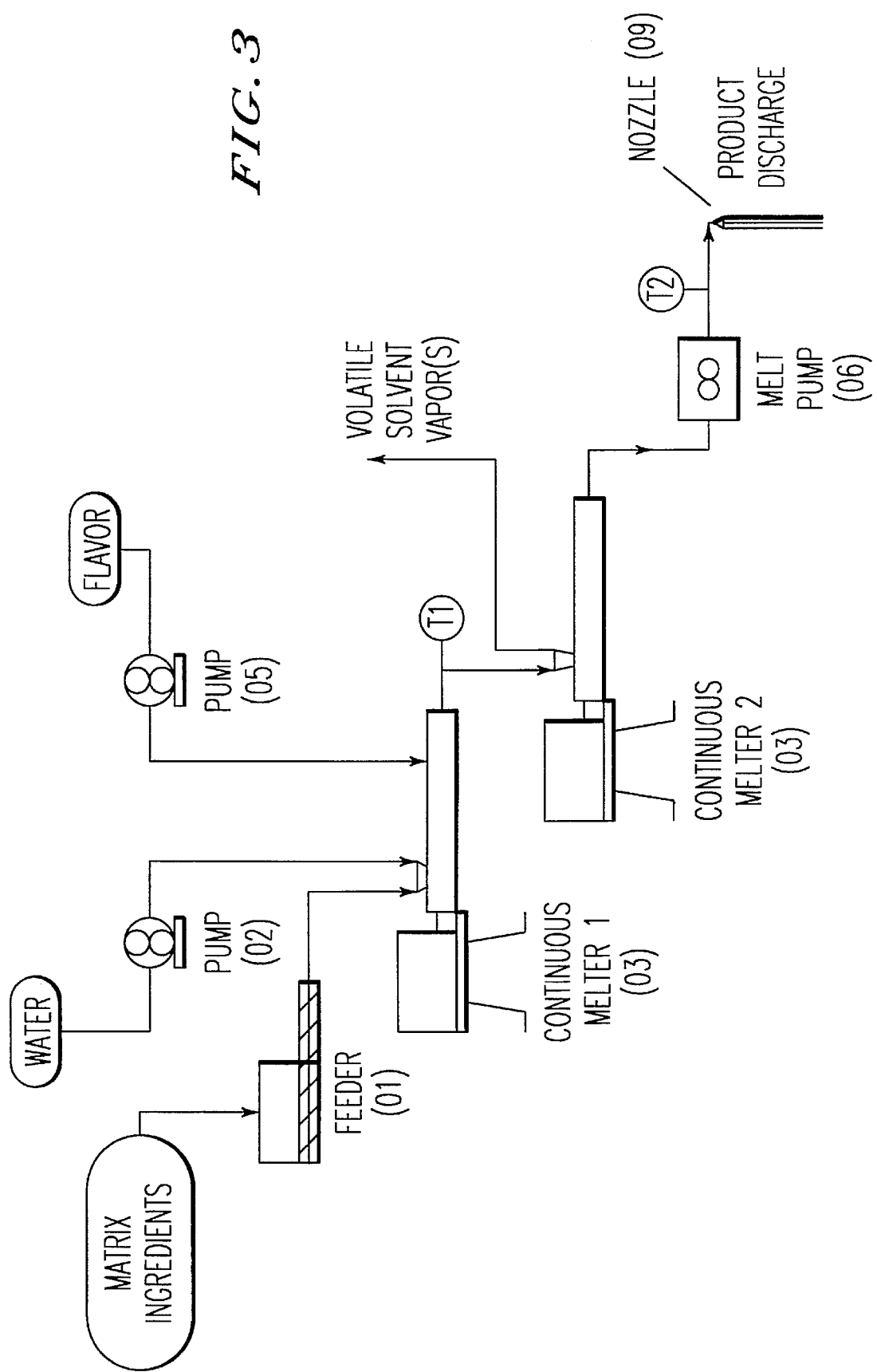
FIG. 3 is an illustration of the present process where the flavor component is diluted in a volatile solvent and said solvent is removed via venting.

Another embodiment of the invention illustrated in FIG. 3 is involved when encapsulating materials that are diluted in large amounts of volatile solvents that plasticize the matrix. When this is the case, the process would consist of an initial melting zone, a flavor mixing zone, a venting zone from which the solvent(s) are allowed to escape, followed by a re-pressurization zone and subsequent forming and cooling. Cooling could take place at either ambient or pressurized conditions, depending on matrix composition, process parameters, and encapsulate.

The equipment which can be used for this process can be essentially the same as that described above. In general, the solvents in which the materials to be encapsulated are dissolved are also solvents for the matrix materials. Thus, the use of a separate solvent in the formation of the melt is optional. However, the use of a separate solvent may be useful to eliminate losses of the desired components during the phase in which the solid matrix is being converted into a melt. The melt may be formed either in a batch process using a tank or large vat as discussed previously or through the use of extruder technology also as discussed previously. The melt is then vented at atmospheric pressure or under vacuum depending on the desired level of solvent removal, vapor pressure of the solvent itself, vapor pressure of the encapsulate, and molten matrix characteristics. The temperature is determined primarily by the conditions under which the venting of the melt is to occur and by the inherent vapor pressure of the solvent or solvents to be removed. If venting is accomplished to atmospheric pressure, higher temperatures are required than if vacuum conditions are used to vent. Once the melt has been vented to remove the desired quantity of solvent thereby concentrating the encapsulate, the matrix is repressurized so as to remove any voids which are formed during the venting and then formed through a die. The amount of solvent to be removed differs depending upon the matrix, the final properties desired in the solidified product, and loading. For hard, dense products more solvent must be removed than if the final product is to be soft. The product at this point may be either cooled under ambient pressure or under elevated pressure as described previously. Furthermore, once the matrix has been repressurized after venting, additional encapsulates may be introduced if desired. If these additional encapsulates are volatile, then it is preferred that the melt be extruded into a pressurized zone having sufficient pressure so as to preclude vaporization of significant quantities of the volatile components during solidification.

This technique has the advantage of allowing one to effectively concentrate vanilla solutions which have generally been difficult to concentrate because of the sensitivity of vanilla to degradation. It is believed that the matrix serves to stabilize the vanilla during the process.

These process steps are illustrated in one embodiment in FIG. 3. Matrix materials are fed continuously to Melter 1 where they are melted prior to flavor injection. The matrix/flavor mixture is discharged to the feed port of Melter 2. Volatile solvents are vented out of the feed port of Melter 2, while the flavor containing melt is conveyed forward and discharged. In this embodiment, the material is fed to a melt pump which conveys the matrix/flavor mixture to forming and cooling operations. Of course, the melt pump is optional. Not shown in this illustration is the linkage of this process with pressure cooling which would be desirable in some cases. Flavorants which can be encapsulated in this technique include:

| Flavor | Volatile Solvents | Wt % orig. flavor weight matrix |
| --- | --- | --- |
| Natural extracts | Water, ethanol | 10–50% |
| Meat hydrolysates | Water | 10–50% |
| Aqueous reaction flavors | Water | 10–50% |
| Compounded flavors containing solvents | water, ethanol | 10–50% |

Additionally, the invention provides for a further enhancement of the above technique by a secondary injection of volatile encapsulates after venting of the solvent from the primary encapsulate and re-pressurization. This, especially when combined with the previously described pressure cooling, allows the encapsulation of a massive variety of encapsulate compositions.

A further variation on the above processes just described involves venting the melting equipment to remove the solvent which has been added to serve as the plasticizer before injection of the flavor component. Thus, if the solvent utilized is water, in case of continuous melting equipment, it would be arranged to have a first mixing zone where the matrix and water are intimately mixed, a second where heat and/or pressure are applied by any means to cause the matrix materials to melt/fluidize and then a pressure reduction section from which the water is allowed to vaporize and thus be removed. Re-pressurization of the matrix would follow, with subsequent flavor injection, mixing, forming, and finally cooling.

Figure 4:
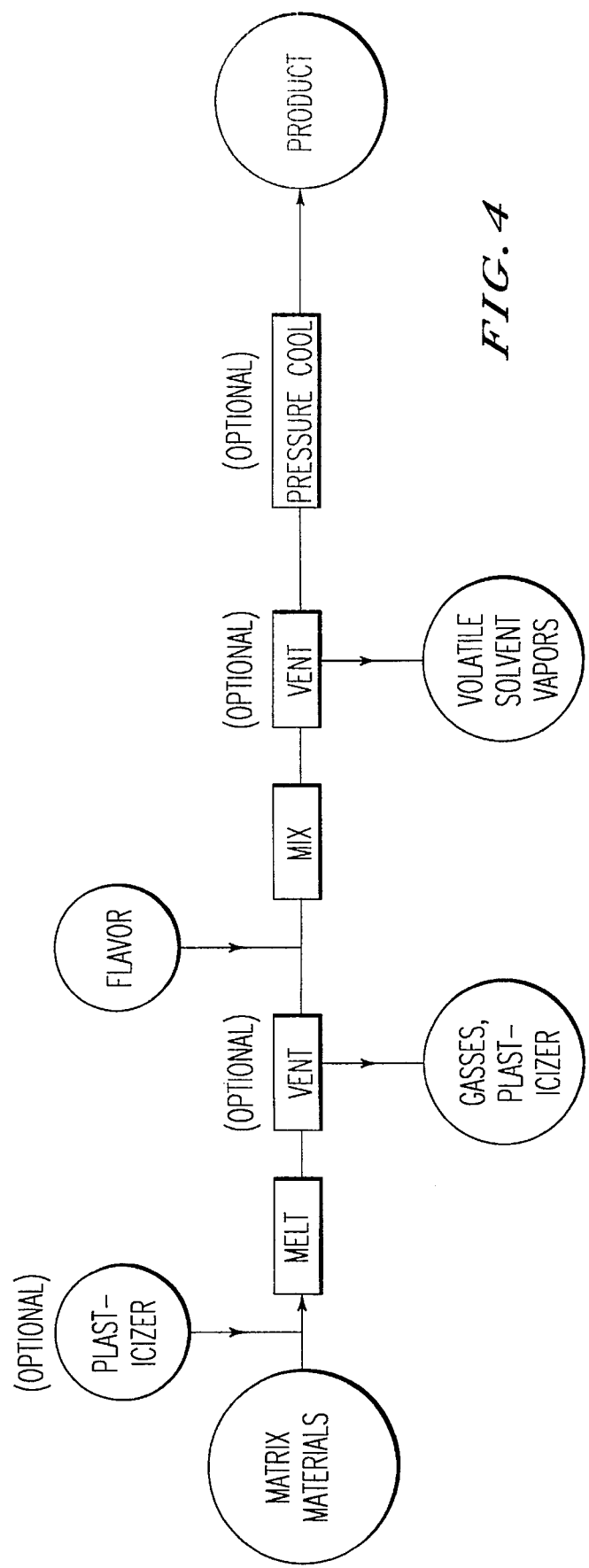
FIG. 4 is a generalized overview of process sequence steps which can be utilized in the present process.

FIG. 4 represents a generalized flow sheet for the foregoing embodiments In its broadest aspect, the process involves converting the matrix materials into a melt, and mixing in the encapsulate and then cooling to produce a dense, amorphous product. When the encapsulate is not soluble in the matrix or is only slightly soluble the result is an encapsulated product while if the encapsulate is soluble in the matrix material there results essentially a solid solution. In the preferred embodiments, a plasticizer solvent is introduced with the matrix to assist in melting This plasticizer solvent may be vented if desired or may be retained in the mixture. The mixing of the encapsulate and matrix can occur either in a continuous process such as in a tubular reactor containing a helix screw to provide positive movement of the matrix from one end to the other or in a separate static mixture which is in fluid communication with the continuous melter which converts the matrix into a melt.

The foregoing process has the advantages of the prior art in that it is not limited to the use of a specific material. Prior art attempts to use maltodextrins as matrix materials have required the use of mixtures of oligosaccharides plus other materials to achieve successful melting and extrusion.

Many of the mat mix ingredients which are contemplated for use in the present process, are excellent film forming materials, such as maltodextrin, which tend to foam if extruded. By applying sufficient pressure in the pressure confinement to preclude foaming, a glassy matrix is achieved. Even matrices which do naturally foam, will foam if the encapsulate contains substantial quantities of low boiling components such as acetaldehyde.

The materials which can be encapsulated will depend upon the matrix material chosen. By selecting the appropriate matrix, it is possible to encapsulate virtually any material with this particular technique. This includes insoluble, and slightly soluble encapsulates and also encapsulates which are soluble when the encapsulate does not detrimentally affect the plasticity and melting point of the matrix. Many matrix materials can be used in this embodiment. Indeed, prior art matrix materials such as those described in the U.S. Pat. No. 5,009,900 as well as those disclosed in U.S. Pat. Nos. 5,124,162, 4,879,130, 4,820,534, 4,738,724, 4,707,367, 4,690,825, 4,689,235, 4,659,390, 4,610,890, 4,388,328, 4,230,687, 3,922,354, 4,547,377, 4,398,422, 3,989,852, 3,970,766, 3,970,765, 3,857,964, 3,704,137, 3,625,709, 3,532,515, 3,041,180, 2,919,989, 2,856,291, 2,809,985, 3,041,180.

The classes of matrix materials include not only those listed in the above citations, but also materials such as mono- and disaccharides, oligomeric carbohydrates such as dextrins, and polymeric carbohydrates such as starches; soluble proteins and especially partially hydrolyzed proteins such as gelatin; other biopolymers; for example, hydrocolloids, gums, natural and modified celluloses; lipids, derivatives and/or any suitable mixtures of the above.

The choice of matrix composition is dependent upon the specific application and physical properties of the amorphous matrix and encapsulant. Levine and Slade (*Water Science Reviews* volume 3, Chapter 2, "Water as A Plasticizer: physico-chemical aspects of low-moisture polymeric systems", pp 79–185, F. Franks (ed.), Cambridge University Press, 1988) reviewed the interrelationship between polymer molecular weight, process, and the role of water as a plasticizer in various food matrices. The physical attributes of glass matrices are key attributes in flavor encapsulation applications. A key requirement in matrix formulation is to control the plasticizer component of the matrix. While water is the most efficient agent for melt processing, the resultant matrix must remain in the non-rubbery state after flavor agents are incorporated. Therefore, one skilled in the art can choose from the variety of components listed in Table 1 as well as other ingredients generally available to the food technologist.

TABLE 1

POTENTIAL MATRIX COMPONENTS

1. High Molecular Weight Polymers

| Proteins | Hydrocolloids |
|---|---|
| Gelatin | Locust bean gum |
| Casein | Glucans |
| Lactalbumins | Guar gum |
| Glutein/glutenin | Pectins |
| Soy protein | Tragacanth |
| Myosin | Gum Arabic |
| Actinomyosin | Carageenans |
| Other soluble or meltable | Alginates |
| proteins | Inulins |
|  | Modified starches |
|  | Pre-gelled starch |
|  | Xanthan |
|  | Gellan |
|  | Modified Celluloses |
|  |  |
|  | Methyl cellulose |
|  | Hydroxypropyl cellulose |
|  | Hydroxypropyl methyl cellulose |
|  | Sodium carboxymethyl |
|  | cellulose (CMC) |

2. Intermediate Molecular Weight Compounds

Dextrins
Corn syrup solids
Cellulans
Maltose syrup solids
High fructose corn syrup solids 3. Low Molecular Weight Compounds

| Plasticizers | Surfactants and Lipids |
|---|---|
| Water | Polyglycerol esters |
| Alcohols | Distilled monoglycerides |
| Glycerol | Medium chain triglycerides |
| Hydrogenated sugars | Lecithin |
| Sugars | Low molecular weight lipids |
| Organic acids |  |

Although not illustrated in the drawings, the finished product can be coated with an anticaking agent should that be necessary. However, caking is generally not a problem when the matrix materials have a sufficiently high softening point, typically above about 40° C. When the encapsulate is not soluble in the matrix, any encapsulate which remains on the surface of the finished product can be removed by utilization of suitable solvent in which the encapsulate is soluble but the matrix is either insoluble or only slightly soluble. While essentially any solvent having such characteristics can be utilized, food grade solvents having those characteristics are preferred. When the encapsulate is a lipophilic flavorant such as lemon oil, orange oil and the like, isopropanol has proven a successful solvent. Such washing may not be necessary where cooling has been accomplished by quenching in a quench medium selected to both cool and remove any surface flavorant from the product.

The present process allows for the successful encapsulation not only of high boiling point materials but also those having boiling points below about 100° C. and most beneficially below 40° C. in molten amorphous matrices. In the prior molten matrix encapsulation art, materials having boiling points below these limits have not been successfully encapsulated in concentrated form but only when diluted with other flavorants. For example, acetaldehyde may be somewhat successfully encapsulated when it has been introduced as a component in oil-based flavorants like lemon oil and orange oil. However, the present process provides for encapsulating pure acetaldehyde at high loadings above about 1 gram of acetaldehyde per 100 grams of matrix. Similar concentrations are possible with other low boiling point materials. With the low boiling point materials, the use of pressure cooling allows for the formation of a dense amorphous matrix, which may be known in the art as a glass; this material being substantially free of porosity, both gross porosity and microporosity. This substantial freedom from porosity will extend the shelf life of the product by reducing the amount of surface area exposed to the atmosphere. Thus, with low boiling point materials, the present process offers the advantage of increased loadings of materials in the matrix and a longer shelf life. The absence of porosity also ensures a dense material that will penetrate through the surface tension of liquids, expediting dissolution, and reducing the opportunity for lumping.

Further, the present process allows for the successful dense matrix encapsulation of materials diluted in volatile solvents. In the prior art, encapsulates diluted in volatile solvent systems could not be successfully encapsulated at commercially significant loads due to the plasticizing effect of the solvent on the matrix. This is overcome by the removal of the solvent after encapsulate injection via atmospheric or vacuum venting. Since the solvent removal takes place from the molten process stream, the resulting product is dense, thus the porosity formation caused by other solvent removal techniques such as spray or freeze drying is avoided. Additionally, secondary encapsulates may be injected into the process stream after removal of the primary encapsulate solvent. This is especially applicable to highly volatile secondary encapsulates, particularly when combined with the pressure cooling embodiment of the present process. Thus, the present process can successfully encapsulate a much wider range of materials in dense, amorphous matrices than was previously possible.

The present process when compared with spray drying and other state of the art processes, offers greater efficiency in encapsulating materials containing volatile components or those diluted in volatile solvents, often at a processing cost advantage. Furthermore, because essentially any material can be encapsulated by proper selection of processing conditions and matrix materials, a wide variety of products can be produced all having essentially about the same density and flow characteristics, an advantage in blending. Furthermore, products which have been encapsulated or otherwise incorporated into matrix materials can be blended together to produce unique flavor combinations with reduced concern for settling or stratification upon standing since the relative densities and particle sizes of the materials can be chosen to be approximately the same. Thus the present process will offer a full range of encapsulants all having approximately the same density and flow characteristics making handling, metering, measuring and the like much easier for the processor.

In the present description, the term "encapsulated product" includes not only those products truly encapsulated, where the encapsulate is insoluble in the matrix but also those products wherein the encapsulate is soluble in the matrix.

As can be appreciated from the foregoing description, the encapsulates in the present process do not need to be subjected to elevated temperatures in the presence of oxygen. This is a significant improvement over spray drying where the use of antioxidants is essential to be able to encapsulate products sensitive to oxidation. Such materials include but are not limited to citrus oils, highly unsaturated lipids, oxidation sensitive colorants and the like. The present process allows the encapsulation of such products reducing the need for the use of antioxidants.

The foregoing process and its variations are illustrated in the examples which follow. These examples are for illustration only and are not intended to limit the scope or application of the present process.

EXAMPLE 1

A carbohydrate based matrix composed of:

56% Amerfond (Domino Sugar, 95% Sucrose, 5% Invert sugar)

42% Lodex-10 Maltodextrin (American Maize, 10 DE)

2% Distilled monoglyceride (Kodak, Myverol 18-07) was fed at a rate of approximately 114 grams/minute into the continuous processor (FIG. 2) with water at 2 grams/minute. The mixture was melted in the processor. The processor was maintained at 121° C. The processor screws were operating at 120 RPM. The molten mixture was discharged directly to the melt pump. Acetaldehyde was injected into the molten matrix on the discharge side of the melt pump using a piston metering pump. A static mixer was used to blend the matrix and flavor together. Immediately prior to flavor injection the temperature of the molten matrix was approximately 138° C. The matrix and acetaldehyde mixture was then delivered under pressure to one of the nozzle discharges for forming and subsequent collection. The flow system was arranged so that forming and solidification could take place under either atmospheric or pressurized conditions. Four samples were taken:

Sample 1: Ambient air cooled on trays.

Sample 2: Atmospheric pressure cylindrical collection vessel in ice bath.

Sample 3: Cooled in cold 99% isopropanol (initial temperature −18° C.) at atmospheric pressure, approximately 130 g sample collected in 2000 g IP.

Sample 4: Pressure cooled; approximately 20 minutes under 3275 kPa in a cylindrical collection vessel in an ice bath.

Visually, samples 1–3 were white and puffed with a porous internal structure. Sample 4 appeared dense, hard and relatively clear.

| Analytical Results | | |
|---|---|---|
| Sample | % Acetaldehyde | Particle Density (g/cm$^3$) |
| 1 | .84 | 1.26 |
| 2 | .87 | — |
| 3 | .66 | 1.35 |
| 4 | 1.67 | 1.63 |

EXAMPLE 2

A carbohydrate based matrix composed of:

56% Sucrose Confectioner's sugar 6X (Domino Sugar)

42% Lodex Maltodextrin (American Maize, 10 DE)

2% Distilled monoglyceride (Kodak, Myverol 18-07) was fed at a rate of approximately 114 grams/minute into the continuous processor (FIG. 1) with water at 2 grams/minute. The mixture was melted in the processor. The processor was maintained at 132° C. The processor screws were operating at 70 RPM. Diacetyl was injected into the molten mixture through a port in the continuous processor using a piston metering pump at a rate of approximately 10 grams/minute. After mixing the mixture was discharged directly into the Zenith melt pump. The matrix and diacetyl mixture was then delivered under pressure to one of the nozzle discharges for forming and subsequent collection. The flow system was arranged so that forming and solidification could take place under either atmospheric or pressurized conditions. Upon discharge from the melt pump, the product temperature was approximately 132° C. Four samples were taken.

Sample 1: Ambient air cooled on trays

Sample 2: Atmospheric pressure cylindrical collection vessel in ice bath

Sample 3: Cooled in cold 99% isopropanol (initial temperature −18° C.) at atmospheric pressure, approximately 125 g sample collected in 2000 g IP (final IP temperature was −8° C.).

Sample 4: Pressure cooled; approximately 20 minutes under 2068 kPa in a cylindrical collection vessel in an ice bath.

Visually, samples 1–3 were pale yellow, relative opaque, and puffed with a porous internal structure. Sample 4 appeared dark yellow, dense, hard and relatively translucent.

| Analytical results: | | |
|---|---|---|
| Sample | % Diacetyl | Particle Density (g/cm$^3$) |
| 1 | 2.40 | 1.33 |
| 2 | 2.26 | — |
| 3 | 2.21 | 1.33 |
| 4 | 3.97 | 1.49 |

EXAMPLE 3

A carbohydrate based matrix composed of:

56% Amerfond (Domino Sugar, 95% Sucrose, 5% Invert sugar)

42% Lodex Maltodextrin (American Maize, 10 DE)

2% Distilled monoglyceride (Kodak, Myverol 18-07)

Flavor:

Vanilla extract (3⅓ fold, 11.9% solids, 39.8% alcohol) was fed at a rate of approximately 114 grams/minute into continuous processor 1 (FIG. 3). The mixture was melted in processor 1. Processor 1 was maintained at 143° C. Processor 1 screws were operating at 70 RPM. The vanilla extract was injected into processor 1 through a port at a flow rate of approximately 22 grams/minute. The molten mixture was discharged directly into processor 2 (143° C. jacket temperature, 120 RPM). Water and ethanol vapor were allowed to escape from the open feedport of processor 2. The molten mixture was discharged into the melt pump which discharged through the nozzle onto trays for cooling and solidification. The product temperature exiting processor 1 was 102° C. The product temperature at the discharge of the melt pump prior to nozzle forming was approximately 115° C.

After cooling, the product was hard and dense, having the flavor characteristics of vanilla extract.

| Analytical Results: | | |
|---|---|---|
| | % Water | % Ethanol |
| Initial composition (by mass balance) | 10.3 | 6.4 |
| Actual product composition | 6.4 | <.1 |
| Volatile solvent losses | 3.9 | 6.4 |

EXAMPLE 4

Conditions were as described in Example 3 except the feed rate for the vanilla was 30 grams/minute and no melt pump was used. The temperature out of processor 1 was 98° C. and the product temperature out of processor 2 was 127° C. After cooling, the product was hard and dense, having the flavor characteristics of vanilla extract.

| Analytical Results: | | |
|---|---|---|
| | % Water | % Ethanol |
| Initial composition (by mass balance) | 12.4 | 8.3 |
| Actual product composition | 7.3 | <.1 |
| Volatile solvent losses | 5.1 | 8.2 |

EXAMPLE 5

A carbohydrate based matrix composed of:

56% Amerfond (Domino Sugar, 95% Sucrose, 5% Invert sugar)

42% Lodex Maltodextrin (American Maize, 10 DE)

2% Distilled monoglyceride (Kodak, Myverol 18-07)

Flavor:

Natural beef flavor #12001 (Flavor and Food Ingredients, Inc., Middlesex, N.J.) having 37.2% total solids and 14.6% salt. Conditions were as described in Example 3 except the feed rate for the beef flavor was 29 grams/minute and no melt pump was used. The temperature out of processor 1 was 112° C. and the product temperature out of processor 2 was 129° C. The jacket temperature was maintained at 160° C. After cooling, the product was hard and dense, having the flavor characteristics of the original flavor.

| Analytical Results: | |
|---|---|
| | % Water |
| Initial composition (by mass balance) | 15.1 |
| Actual product composition | 7.0 |
| Volatile solvent losses | 8.1 |

We claim:

1. A process for incorporating a volatile component into a matrix, comprising:

(1) heating and mixing a matrix and a volatile component to obtain a liquid melt comprising said volatile component and said matrix; and (2) solidifying said melt under a pressure sufficient to prevent substantial volatilization of said volatile component, wherein said solidifying is carried out in a pressure vessel under a pressure which is greater than the vapor pressure of said volatile component at the temperature of said melt, to obtain a dense, amorphous solid directly upon said solidifying said melt, wherein said volatile component is selected from the group consisting of diacetyl and acetaldehyde.

2. The process of claim 1, wherein said pressure is from 2068 to 3275 kPa.

3. The process of claim 1, wherein said melt is formed by: admixing a solid matrix material with a plasticizer and heating to form a melt; reducing the pressure on said melt so as to remove any gases present and to volatize at least a portion of said plasticizer and removing said portion from said melt; and admixing with the resulting melt said volatile component under pressure and temperature conditions sufficient to prevent substantial volatilization of said volatile component.

4. The process of claim 1, wherein said volatile component is acetaldehyde.

5. The process of claim 1, wherein said matrix is selected from the group consisting of maltodextrins, corn syrup solids, maltose syrup solids, high fructose corn syrup solids, starches, hydrocolloids, gums, proteins, partially hydrolyzed proteins, modified proteins, modified hydrocolloids, and modified celluloses.

6. The process of claim 1, wherein less than 50% of said volatile component is volatized during said solidification.

7. The process of claim 1, wherein less than 25% of said volatile component is volatized during said solidification.

8. The process of claim 1, wherein less than 10% of said volatile component is volatized during said solidification.

9. The process of claim 1, wherein said matrix comprises a modified starch.

10. A process of encapsulating materials dissolved in a volatile solvent in a matrix, comprising:

(a) heating and mixing a matrix and a solution of a material dissolved in a volatile solvent to obtain a liquid melt comprising said matrix and said material dissolved in a volatile solvent;

(b) adjusting at least one of the temperature and pressure of said melt to cause at least a portion of said volatile solvent to volatize to form a melt having a reduced solvent content; and (c) solidifying the resulting melt, wherein after said at a portion of said volatile solvent is removed, a volatile component is introduced into the resulting melt under pressure sufficient to prevent substantial volatilization of said volatile component to obtain a melt containing a volatile component, and said melt containing a volatile component is subsequently solidified under a pressure which is greater than the vapor pressure of said volatile component at the temperature of said melt, wherein said volatile component is selected from the group consisting of diacetyl and acetaldehyde.

11. The process of claim 10, wherein said material dissolved in said volatile solvent is a natural extract and said volatile solvent is water, ethanol or a water-ethanol mixture.

12. The process of claim 10, wherein said material dissolved in said volatile solvent is a meat hydrolysate and said volatile solvent is water.

13. The process of claim 10, wherein said material dissolved in said volatile solvent is an aqueous reaction flavor and said volatile solvent is water.

14. The process of claim 10, wherein said material dissolved in said volatile solvent is a compounded flavor and said volatile solvent is water, ethanol or a water-ethanol mixture.

15. The process of claim 10, wherein said material dissolved in said volatile solvent is vanilla and said volatile solvent is water, ethanol or a water-ethanol mixture.

16. The process of claim 10, wherein the melt is solidified under temperature and pressure conditions sufficient to produce a dense, amorphous solid.

17. The process of claim 10, wherein less than 50% of said volatile component is volatized during said solidification.

18. The process of claim 10, wherein less than 25% of said volatile component is volatized during said solidification.

19. The process of claim 10, wherein less than 10% of said volatile component is volatized during said solidification.

20. The process of claim 10, wherein said matrix comprises a modified starch.

* * * * *